US008757028B2

(12) United States Patent
Broughton et al.

(10) Patent No.: US 8,757,028 B2
(45) Date of Patent: Jun. 24, 2014

(54) CRANKSHAFT FOR A TWO-STROKE ENGINE

(75) Inventors: George Broughton, Wadsworth, IL (US); Andrew Findlay, Pleasant Prairie, WI (US); John Valek, Winthrop Harbor, IL (US); James E. Macier, Beach Park, IL (US)

(73) Assignee: BRP US Inc., Sturtevant, WI (US)

( * ) Notice: Subject to any disclaimer, the term of this patent is extended or adjusted under 35 U.S.C. 154(b) by 321 days.

(21) Appl. No.: 13/332,679

(22) Filed: Dec. 21, 2011

(65) Prior Publication Data

US 2012/0204848 A1 Aug. 16, 2012

Related U.S. Application Data

(60) Provisional application No. 61/426,811, filed on Dec. 23, 2010.

(51) Int. Cl.
*F02B 25/00* (2006.01)
*F01M 1/02* (2006.01)
*F02B 75/24* (2006.01)
*F16C 7/00* (2006.01)
*F16C 3/04* (2006.01)
*F16N 13/22* (2006.01)

(52) U.S. Cl.
USPC ............... 74/603; 74/595; 74/596; 74/597; 74/605; 123/53.2; 123/53.4; 123/197.3; 123/197.4; 123/65 R; 123/196 R; 184/12; 184/13.1; 184/14

(58) Field of Classification Search
USPC ............... 123/53.2, 53.4, 197.3, 197.4, 65 R, 123/196 R; 74/595, 596, 597, 605; 184/12, 184/13.1, 14
See application file for complete search history.

(56) References Cited

U.S. PATENT DOCUMENTS

| | | | |
|---|---|---|---|
| 1,872,365 A | 8/1932 | Underwood | |
| 1,898,631 A | 2/1933 | Irgens | |
| 2,730,912 A * | 1/1956 | Marinelli | 74/597 |
| 3,489,033 A * | 1/1970 | Jobling | 74/598 |

(Continued)

FOREIGN PATENT DOCUMENTS

| | | |
|---|---|---|
| GB | 685252 | 12/1952 |
| GB | 807325 | 1/1959 |

(Continued)

OTHER PUBLICATIONS

English Abstract of JP04397263, Published Oct. 30, 2009; Retrieved from the Internet: http://.com on Sep. 26, 2013.

(Continued)

*Primary Examiner* — Lindsay Low
*Assistant Examiner* — Tea Holbrook
(74) *Attorney, Agent, or Firm* — BCF LLP

(57) ABSTRACT

A crankshaft has a receiving platform for catching lubricant dropping from a main bearing assembly. The receiving platform has at least one wall disposed thereon. The wall has one point that is the furthest from the rotational axis of the crankshaft. One channel is defined in the platform and has an inlet disposed close to the point of the wall that is furthest from the rotational axis of the crankshaft. The channel has an outlet in the vicinity of a connecting rod bearing assembly, so that lubricant dropped on the receiving platform will flow to the connecting rod bearing assembly.

25 Claims, 13 Drawing Sheets

(56) References Cited

U.S. PATENT DOCUMENTS

| | | |
|---|---|---|
| 4,768,397 A | 9/1988 | Adams |
| 5,193,500 A | 3/1993 | Haft |
| 5,207,120 A * | 5/1993 | Arnold et al. ............ 74/595 |
| 5,375,573 A | 12/1994 | Bowman |
| 5,570,662 A | 11/1996 | Niemchick et al. |
| 5,617,822 A | 4/1997 | Masuda |
| 5,778,847 A | 7/1998 | Takahashi et al. |
| 5,836,218 A * | 11/1998 | Lee ............................. 74/605 |
| 6,032,628 A | 3/2000 | Watanabe et al. |
| 6,076,495 A | 6/2000 | Takahashi et al. |
| 6,138,634 A | 10/2000 | Kusche et al. |
| 6,481,389 B2 | 11/2002 | Suzuki et al. |
| 6,792,900 B2 | 9/2004 | Kato |
| 6,845,744 B2 | 1/2005 | Haman |
| 7,077,096 B2 | 7/2006 | Matsuda |
| 7,152,569 B2 | 12/2006 | Leiber et al. |
| 2008/0011122 A1 * | 1/2008 | Singer ........................ 74/597 |
| 2009/0136171 A1 | 5/2009 | Rutschmann et al. |

FOREIGN PATENT DOCUMENTS

| | | |
|---|---|---|
| GB | 997760 | 7/1965 |
| JP | 3160168 | 7/1991 |
| JP | 2009150323 | 7/2009 |
| JP | 04397263 B2 | 10/2009 |

OTHER PUBLICATIONS

English Abstract of JP03160168, Published Jul. 10, 1991; Retrieved from the Internet: http://worldwide.espacenet.com on Sep. 26, 2013.

English Abstract of JP2009150323, Published Sep. 7, 2009; Retrieved from the Internet: http://ipdl.inpit.go.jp/ on Sep. 26, 2013.

* cited by examiner

CRANKSHAFT FOR A TWO-STROKE ENGINE

CROSS-REFERENCE

The present application claims priority to U.S. Provisional Application No. 61/426,811, filed Dec. 23, 2010, the entirety of which is incorporated herein by reference.

FIELD OF THE INVENTION

The present invention relates generally to a crankshaft for a two-stroke engine and to a two-stroke engine comprising such crankshaft.

BACKGROUND

As with other types of internal combustion engines, two-stroke engines comprise a crankshaft disposed in a crankcase for converting the linear movement of the engine's piston, or pistons, into rotating torque. The crankshaft usually comprises a crankshaft body made of a single piece of hard material, such as steel, and the main components of the crankshaft are integrally formed with the crankshaft body. In some instances, the crankshaft body may also be made of parts connected together by various means known in the art. The crankshaft is rotatably connected to the crankcase via a plurality of main bearing assemblies, and rotatably connected to the connecting rods transmitting the energy generated by the pistons via connecting rod bearing assemblies. Since the crankshaft usually rotates at high speed within the crankcase, the various bearing assemblies connected thereto, including the connecting rod bearing assemblies, need to be appropriately lubricated.

Two-stroke engines do not generally have sophisticated pressurized lubrication systems for lubricating all the various components of the crankshaft and the various components connected thereto such as those generally found in four-stroke engines. This is particularly true regarding vertically oriented two-stroke engines used in marine outboard engines.

In particular, it is know in the art to lubricate the connecting rod bearing assemblies of vertically oriented two-stroke engines by spraying lubricant within the crankcase in the vicinity of the connecting rod bearing assemblies rotating path using low capacity lubricant pumps. U.S. Pat. No. 5,193,500 and U.S. Pat. No. 5,375,573 provide examples of such connecting rod bearing assemblies lubrication systems.

However, since lubricant is not discharged directly within or close to the connecting rod bearing assemblies, a significant volume of lubricant is required to appropriately lubricate the connecting rod bearing assemblies. Furthermore, a significant portion of the lubricant sprayed into the crankcase finds its way to the combustion chamber of the cylinders, and incomplete combustion of such lubricant within the combustion chamber increases the engine's pollutant emissions.

In view of the above, there is a need for a vertically oriented two-stroke engine having a lubrication system for the connecting rod bearings assemblies discharging a limited volume of lubricant in the vicinity of such connecting rod bearing assemblies so that less lubricant need to be used and less lubricant is ultimately burned in the combustion chamber, which entails that less pollutant emissions are release in the atmosphere when the two-stroke engine is used.

SUMMARY

It is an object of the present invention to ameliorate at least some of the inconveniences present in the prior art by providing a crankshaft having a receiving platform for catching lubricant dropping from a main bearing assembly, the receiving platform having at least one wall disposed thereon, said wall having one point that is the furthest from the rotational axis of the crankshaft, and one channel defined in the platform having an inlet disposed close to the point of the wall that is furthest from the rotational axis of the crankshaft, the channel having an outlet in the vicinity of a connecting rod bearing assembly, so that lubricant dropped on the receiving platform will flow to the connecting rod bearing assembly.

It is another object of the present invention to provide a crankshaft for a two-stroke engine having a crankshaft body defining a rotational axis. The crankshaft comprises at least one main bearing journal and at least one crankpin connected thereto, the at least one crankpin being axially spaced from the at least one main bearing journal. The crankshaft body also comprises at least one receiving platform connected thereto, the at least one receiving platform being disposed between the at least one main bearing journal and the at least one crankpin. The at least one receiving platform has a top surface and a bottom surface, the top surface being disposed between the bottom surface and the at least one main bearing journal. The top surface also has an edge and a wall, portions of the wall being non-equidistant from the rotational axis of the crankshaft body and one of the portions of the wall being furthest from the rotational axis, the one of the portions being an outermost portion. At least one channel is defined at least in part within the at least one receiving platform, the at least one channel having a channel inlet and a channel outlet. The channel inlet is disposed between the outermost portion and the rotational axis, in proximity to the outermost portion. The channel outlet is disposed in proximity to the at least one crankpin.

In one aspect, the at least one main bearing journal, the at least one crankpin and the at least one receiving platform are integrally formed with the crankshaft body.

In an additional aspect, the channel outlet is further from the rotational axis than the channel inlet.

In a further aspect, at least a portion of the at least one channel extends away from the rotational axis as the at least one channel extends from the channel inlet to the channel outlet.

In an additional aspect, the wall defines a closed perimeter disposed between the wall and the rotational axis.

In a further aspect, a shape of the closed perimeter is one of a circle, an oval and an ellipse.

In an additional aspect, a shape of the closed perimeter is a circle, a center of the circle being offset from the rotational axis.

In a further aspect, the crankshaft further comprises a recess formed within the top surface of the at least one receiving platform and the inlet of the at least one channel is disposed within the recess.

In an additional aspect, the at least one crankpin is at least two crankpins, the at least one channel is at least two channels, and the at least two channels has respective channel inlets disposed adjacent to each other. One of the at least two channels has a channel outlet disposed in proximity to one of the at least two crankpins, and an other of the at least two channels has a channel outlet disposed in proximity to an other of the at least two crankpins.

In a further aspect, when the crankshaft is in use in the two-stroke engine, the rotational axis is generally vertical, the at least one main bearing journal is housed within at least one main bearing body, the at least one main bearing journal and the at least one main bearing body forming at least one main bearing assembly, and the at least one crankpin is housed in at least one connecting rod bearing body, the at least one crankpin and at least one connecting rod bearing forming at least one connecting rod bearing assembly. Lubricant is supplied to the at least one main bearing assembly and at least a portion of the lubricant drops from the at least one main bearing assembly on the top surface of the receiving platform. A portion of the lubricant on the top surface of the at least one receiving platform is induced by centrifugal force to flow to the outermost portion and lubricant within the outermost portion flows in the at least one channel via the channel inlet. Lubricant flowing in the at least one channel is discharged from the channel outlet, and from the channel outlet the lubricant flows to the at least one connecting rod bearing assembly.

In an additional aspect, the at least one receiving platform is a sealing plate.

It is another object of the present invention to provide a crankshaft for a two-stroke engine having a crankshaft defining a rotational axis. The crankshaft body comprises at least one main bearing journal and at least one crankpin connected thereto, the at least one crankpin being axially spaced from the at least one main bearing journal. The crankshaft body also comprises at least one receiving platform connected thereto, the at least one receiving platform being disposed between the at least one main bearing journal and the at least one crankpin. The at least one receiving platform has a top surface and a bottom surface, the top surface being disposed between the bottom surface and the at least one main bearing journal. The top surface has an edge and at least one wall, portions of the at least one wall being non-equidistant from the rotational axis of the crankshaft body and at least one portion of the at least one wall being more distant from the rotational axis than other portions of the at least one wall, the at least one portion of the at least one wall being at least one outer portion. At least one channel is defined at least in part within the at least one receiving platform, the at least one channel having a channel inlet and a channel outlet. The channel inlet is disposed between the at least one outer portion and the rotational axis, in proximity to the at least one outer portion. The channel outlet is disposed in proximity to the at least one crankpin.

In a further aspect, the at least one main bearing journal, the at least one crankpin and the at least one receiving platform are integrally formed with the crankshaft body.

In an additional aspect, the channel outlet is further from the rotational axis than the channel inlet.

In a further aspect, the at least one channel extends away from the rotational axis as the at least one channel extends from the channel inlet to the channel outlet.

In an additional aspect, the at least one wall is at least two walls, the at least one outer portion is at least two outer portions, and the at least one channel is at least two channels. Each one of the at least two channels has an inlet and an outlet. Each of the at least two outer portions has disposed therein at least one of the channel inlets.

In a further aspect, the at least one crankpin is at least two crankpins and the channel outlet of at least one of the at least two channels is disposed in proximity to one of the at least two crankpins. The channel outlet of at least one other of the at least two channels is disposed in proximity to at least one other of the at least two crankpins.

It is another object of the present invention to provide a crankshaft for a two-stroke engine having a crankshaft body defining a rotational axis. The crankshaft comprises at least one main bearing journal and at least one crankpin connected thereto, the at least one crankpin being axially spaced from the at least one main bearing journal. The crankshaft also comprises at least one receiving platform connected thereto, the at least one receiving platform being disposed between the at least one main bearing journal and the at least one crankpin. The at least one receiving platform has a top surface and a bottom surface, the top surface being disposed between the bottom surface and the at least one main bearing journal. The top surface has an edge and a wall defining a closed perimeter, portions of the closed perimeter being non-equidistant from the rotational axis and at least one portion of the closed perimeter being more distant from the rotational axis than other portions of the closed perimeter, the at least one portion of the closed perimeter being at least one outer portion. At least one channel is defined at least in part within the at least one receiving platform, the at least one channel having a channel inlet and a channel outlet. The channel inlet is disposed within the closed perimeter in proximity to the at least one outer portion, and the channel outlet is disposed in proximity to the at least one crankpin.

In an additional aspect, the at least one main bearing journal, the at least one crankpin and the at least one receiving platform are integrally formed with the crankshaft body.

In a further aspect, the at least one channel is at least two channels, each one of the at least two channels having an inlet and an outlet. The at least one outer portion of the closed perimeter is at least two outer portions, and each of the at least two outer portions have disposed therein at least one of the channel inlets.

In an additional aspect, the at least one crankpin is at least two crankpins. The channel outlet of at least one of the at least two channels is disposed in proximity to one of the at least two crankpins, and the channel outlet of at least one other of the at least two channels is disposed in proximity with at least one other of the at least two crankpins.

It is another object of the present invention to provide a two-stroke engine comprising an engine casing, at least one cylinder disposed within the engine casing, and at least one piston movable within the at least one cylinder. The two-stroke engine also comprises a crankshaft having a crankshaft body defining a rotational axis. The crankshaft comprises at least one main bearing journal, at least one crankpin and at least one receiving platform having a top surface and a bottom surface, the at least one main bearing journal, the at least one crankpin and the at least one receiving platform being connected to the crankshaft body. The at least one crankpin is axially spaced from the at least one main bearing journal and the at least one receiving platform is disposed so that the top surface is disposed between the bottom surface and at least one main bearing journal. The crankshaft is rotatably mounted within the engine casing via at least one main bearing assembly comprising a main bearing body and one of the at least one main bearing journal, the main bearing body being connected to the engine casing. At least one connecting rod has a first end and a second end, the first end being operatively connected to the at least one piston and the second end being rotatably connected to the crankshaft via a connecting rod bearing assembly comprising a connecting rod body and one of the at least one crankpin, the connecting rod body being connected to the second end of the connecting rod. The top surface of the at least one receiving platform has an edge and a wall, portions of the wall being non-equidistant from the rotational axis and one of the portions of the wall being furthest from the rotational axis, the one of the portions being an outermost portion. At least one channel is defined at least in part within the at least one receiving platform, the at least one channel having a channel inlet and a channel outlet. The channel inlet is disposed between the outermost portion and the rotational axis, in proximity to the outermost portion. The channel outlet is disposed in proximity to the connecting rod bearing assembly of one of the at least one connecting rod.

In an additional aspect, the at least one main bearing journal, the at least one crankpin and the at least one receiving platform are integrally formed with the crankshaft body.

In a further aspect, the at least one channel extends away from the rotational axis as the at least one channel extends from the channel inlet to the channel outlet.

In an additional aspect, the wall defines a closed perimeter.

For purposes of this application, terms used to locate elements on an engine or their spatial orientation, such as "forwardly", "rearwardly", "front", "back", "rear", "left", "right", "up", "down", "above", and "below", are as they would normally be understood by a person operating the engine in its normal operation position.

Embodiments of the present invention each have at least one of the above-mentioned aspects and/or aspects, but not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DETAILED DESCRIPTION

Figure 1:
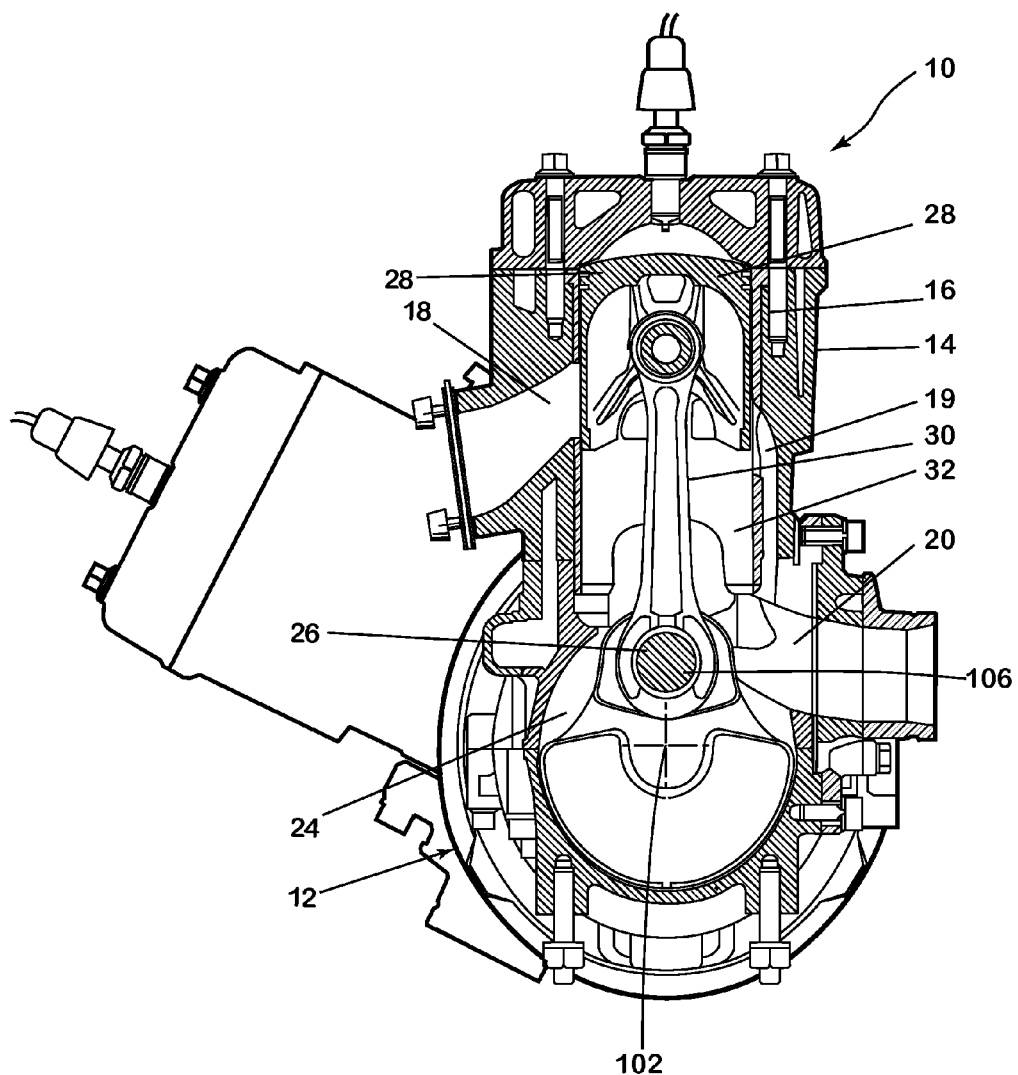
FIG. 1 is a transverse cross-sectional view of a portion of a two-stroke engine.

FIG. 1 illustrates a conventional vertically oriented two-stroke engine 10 comprising a crankcase 12 and a cylinder block 14 connected to the crankcase 12.

A cylinder 16 is disposed in the cylinder block 14 and has an exhaust port 18 and a transfer port 19. The cylinder 16 may be formed in the cylinder block 14 in any suitable manner known in the art, such as by disposing a cylinder liner in a cylindrical bore formed in the cylinder block 14, or by coating the inner surface of the cylindrical bore with a suitable coating such as Nicasil.

The crankcase 12 has an admission port 20 and an internal chamber 24. A crankshaft 26 is disposed in the internal chamber 24 of the crankcase 12.

A piston 28 is connected to the crankshaft 26 via a connecting rod 30 so as to reciprocate in the cylinder bore 32. The piston 28 is adapted to open or close the exhaust port 18 and a transfer port 19.

The two-stroke engine 10 has more than one cylinder 16, each having an exhaust port 18 and a transfer port 19, a corresponding number of piston 28 housed therein and a corresponding number of connecting rod 30 connected to the crankshaft 26. For each corresponding cylinder 16, the crankcase 12 has one corresponding admission port 20 and one internal chamber 24. In this embodiment, the two-stroke engine 10 is a V-6 and has therefore six cylinders 16 disposed in a "V" configuration.

Figure 2:
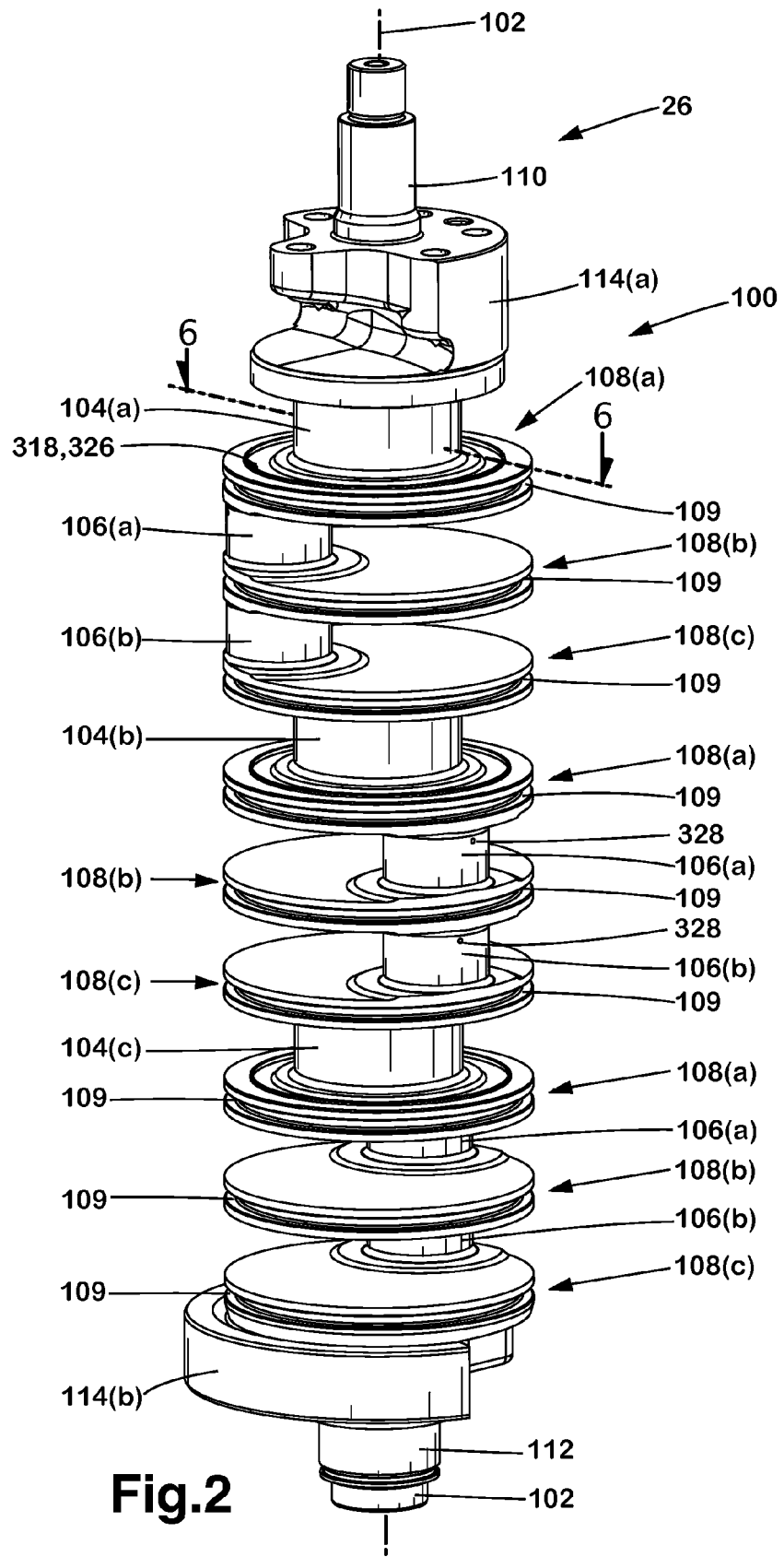
FIG. 2 is a perspective view of a crankshaft according to a first embodiment.

As shown in FIG. 2, the crankshaft 26 comprises a crankshaft body 100 defining a rotational axis 102. The crankshaft body 100 comprises the main bearing journals 104(a), 104(b), 104(c), three groups of two crankpins 106(a), 106(b) and three groups of three sealing plates 108(a), 108(b), 108(c). Each of the main bearing journals 104, crankpins 106 and sealing plates 108 are integrally formed with the crankshaft body 100 although it is contemplated that in other embodiments, they may consist of distinct parts connected together by any suitable mean known in the art. Each sealing plate 108 has a circumferential groove 109 defined therein for receiving a sealing ring (not shown).

The crankshaft body 100 also comprises shafts 110 and 112 at each of its extremities. Shaft 110 connects the crankshaft 26 to the flywheel (not shown) of the two-stroke engine 10, and shaft 112 connects the crankshaft 26 to the drive shaft (not shown) of the two-stroke engine 10. Counterweights 114(a), 114(b) are disposed on the crankshaft body 100 to balance the crankshaft 26. It is contemplated that in other embodiments, the crankshaft body may comprises additional bearing journals, including end main bearing journals, as well as other structures for connecting the crankshaft 26 to the two-stroke engine's 10 flywheel and drive shaft. It is also contemplated that in other embodiments, other counterweights may be disposed along the crankshaft body 100.

Figure 3:
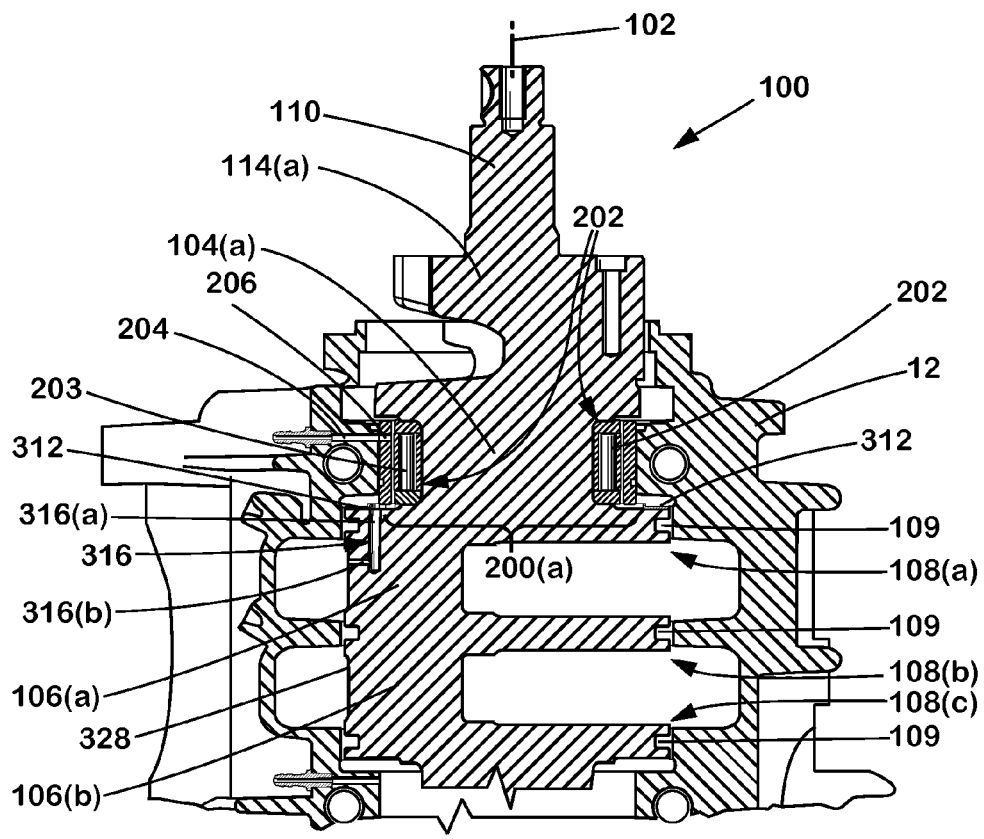
FIG. 3 is a cross-sectional view of a portion of a crankcase and a portion of the crankshaft of FIG. 2.
Figure 3A:
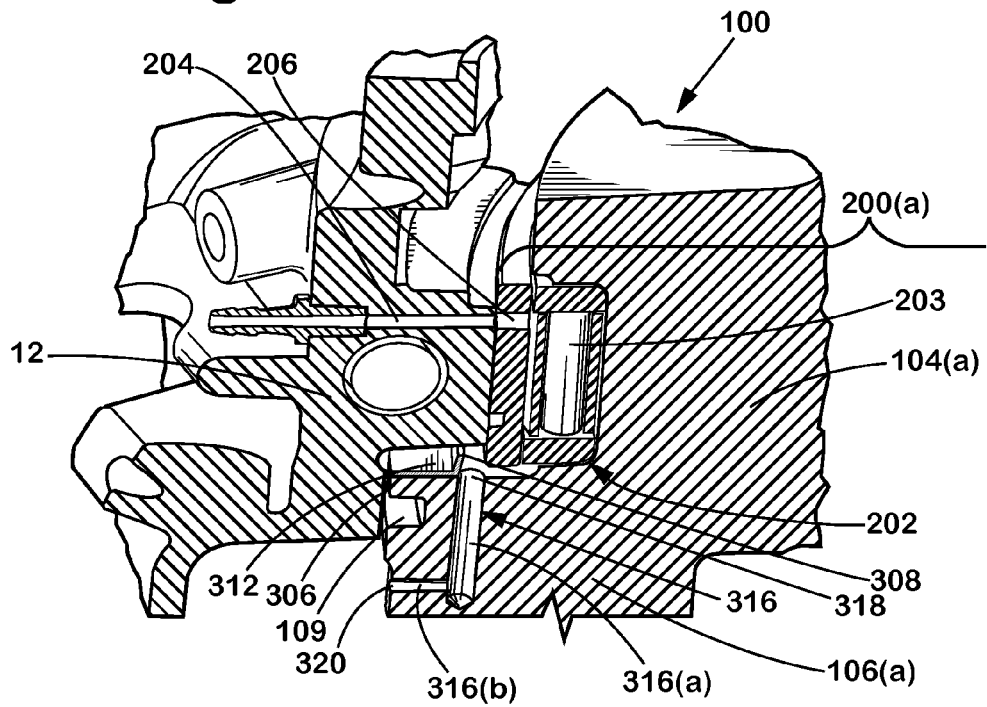
FIG. 3(a) is a enlarged portion of FIG. 3.
Figure 4:
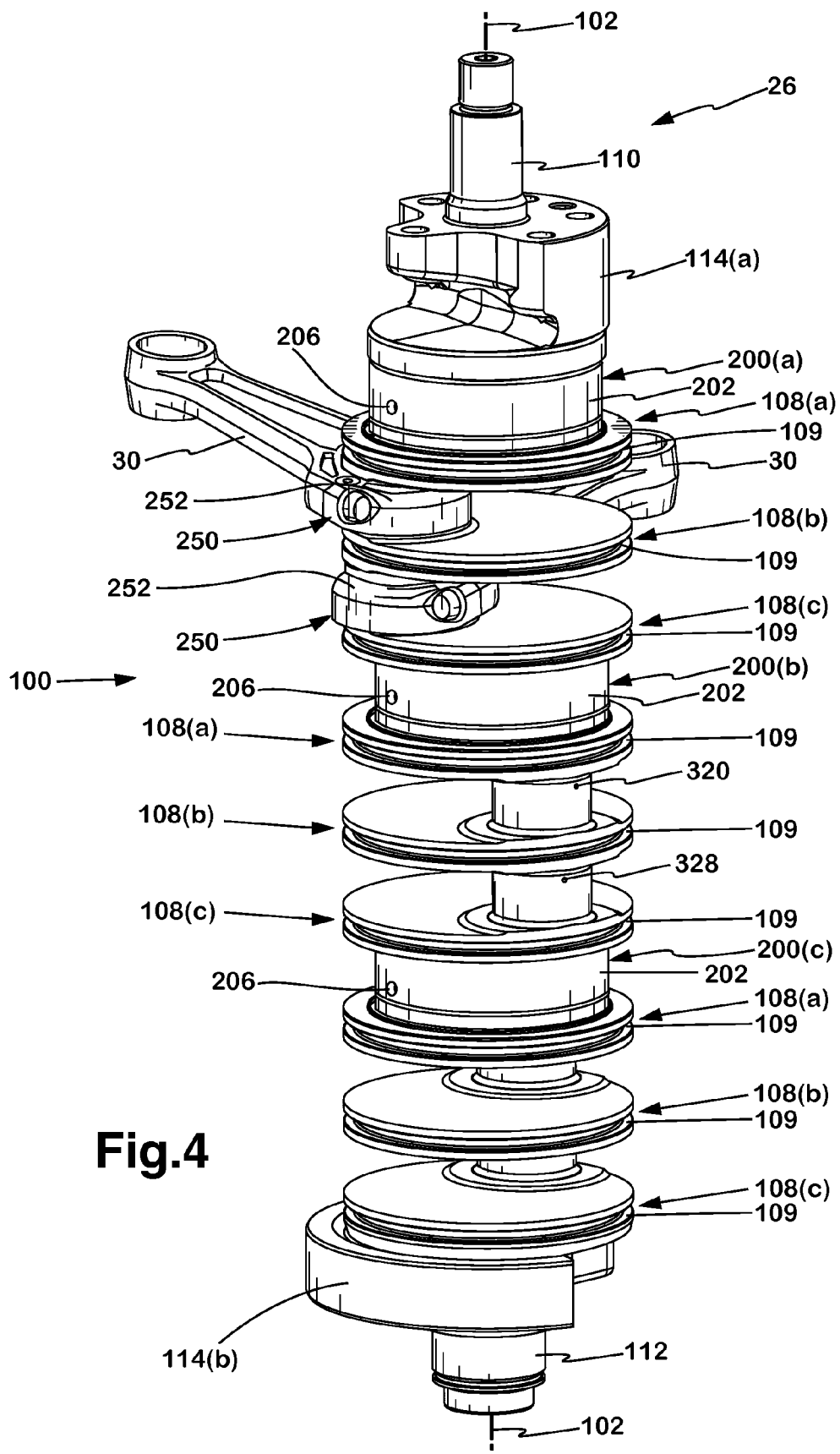
FIG. 4 is a perspective view of the crankshaft of FIG. 2 with three main bearings and two connecting rods mounted thereto.

As shown in FIG. 4, the crankshaft 26 is mounted within the crankcase 12 via main bearing assemblies 200(a), 200(b), 200(c), each of which comprises a main bearing body 202, one of the main bearing journal 104 housed therein, and a plurality of needle bearings 203 (see FIGS. 3 and 3(a)). The needle bearings 203 are housed in the main bearing body 202 between the main bearing body 202 and the main bearing journal 104 for supporting the main bearing journal 104 within the main bearing body 202 and allowing the main bearing journal 104 to rotate within the main bearing body 202. Ports 206 are defined within the main bearing body 202 of each main bearing assembly 200, and a conduit 204 is fluidly connected to each port 206. Lubricant flows within the main bearing assemblies 200 through conduits 204 and ports 206.

As shown in FIG. 4, the crankshaft 26 is connected to each of the connecting rods 30 via a connecting rod bearing assembly 250 comprising a main bearing body 252 connected to a connecting rod 30, one of the crankpins 106 housed within the main bearing body 252, and a plurality of needle bearings (not shown) housed in the main bearing body 252 between the main bearing body 252 and the crankpin 106 for supporting the crankpin 106 within the main bearing body 252 and allowing the crankpin 106 to rotate within the main bearing body 202.

As shown in FIGS. 1 to 4, the sealing plates 108 are disposed between each main bearing journal 104 and crankpins 106 for defining internal chambers 24 within the crankcase 12. When the crankshaft 26 is standing in a vertical position in the crankcase 12 of the vertically oriented two-stroke engine 10, the sealing plates 108(a) are disposed adjacent to and below each one of the main bearing journals 104 and therefore, once the crankshaft 26 is mounted in the crankcase 12, adjacent to and below each main bearing assemblies 250. The sealing plates 108(b) are disposed between successive crankpins 106 along the crankshaft body 100 and therefore, once the crankshaft 26 is connected to the connecting rods 30, between two connecting rod bearing assemblies 250. When the crankshaft 26 is standing in a vertical position, sealing plates 108(c) are disposed adjacent to and above each one of the main bearing journals 104 and therefore, once the crankshaft 26 is mounted in the crankcase 12, adjacent to and above each main bearing assemblies 250.

It is contemplated that in other embodiments where the two-stroke engine 10 does not have independent internal chambers 24, the crankshaft body 100 would not comprise sealing plates 108 but rather other structures connecting the main bearing journals 104 and crankpins 106.

Figure 5:
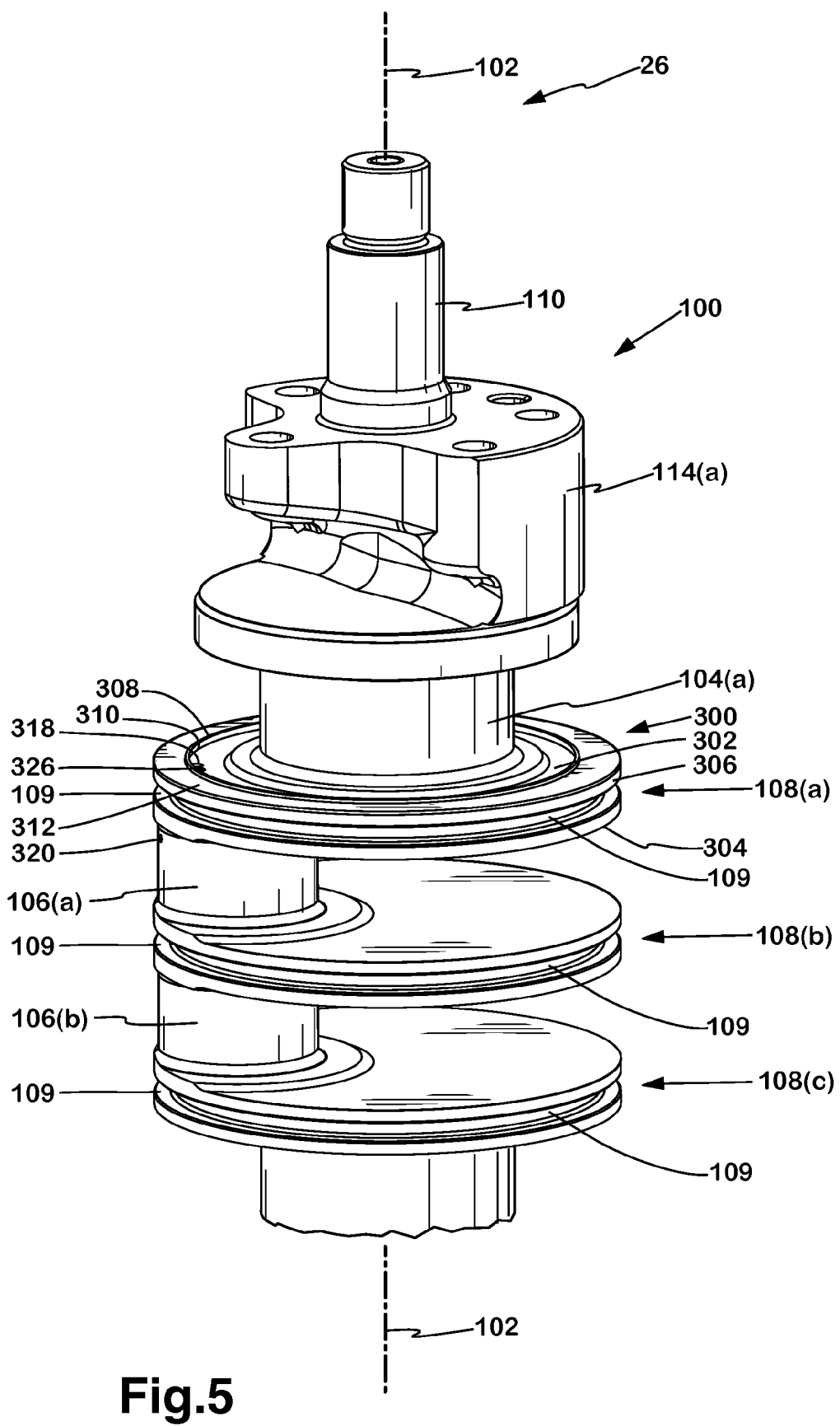
FIG. 5 is a perspective view of an enlarged portion of the crankshaft of FIG. 2.

As shown in FIG. 5 each one of the sealing plates 108(a) defines a platform 300 having a top surface 302, and a bottom surface 304. It is contemplated that in other embodiments where the crankshaft body 100 does not comprise sealing plates 108, the platforms 300 are defined by the other structure connecting the main bearing journals 104 and crankpins 106.

The top surface 302 has an edge 306 and a wall 308 defining a closed perimeter 310. In this embodiment, the wall 308 is formed by a ring 312 made of steel and welded to the top surface 302. It is contemplated that in other embodiments, the ring 312 may be made of any other hard material fastened to the top surface 302 by any other suitable mean. It is also contemplated that in other embodiments, the wall 308 can be integrally formed with the platform 300. It is also contemplated that the wall 308 could be formed by a recess in the platform 300.

Figure 6:
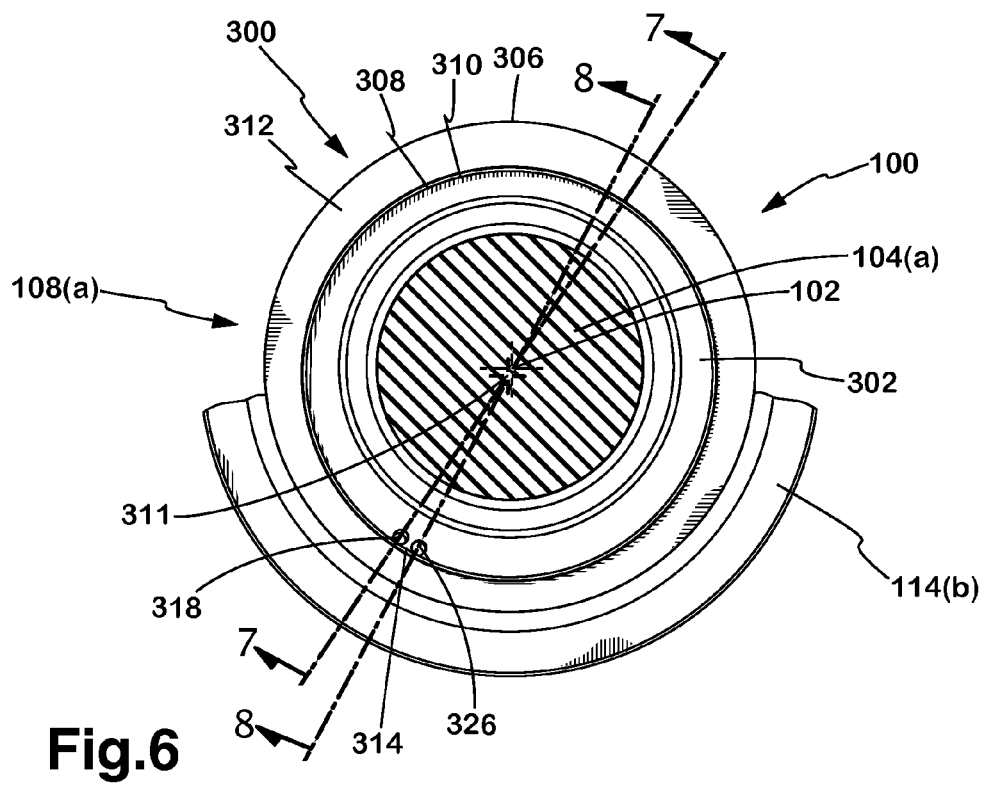
FIG. 6 is a transverse cross-sectional view of the crankshaft of FIG. 2 taken along line 6-6 in FIG. 2.
Figure 6A:
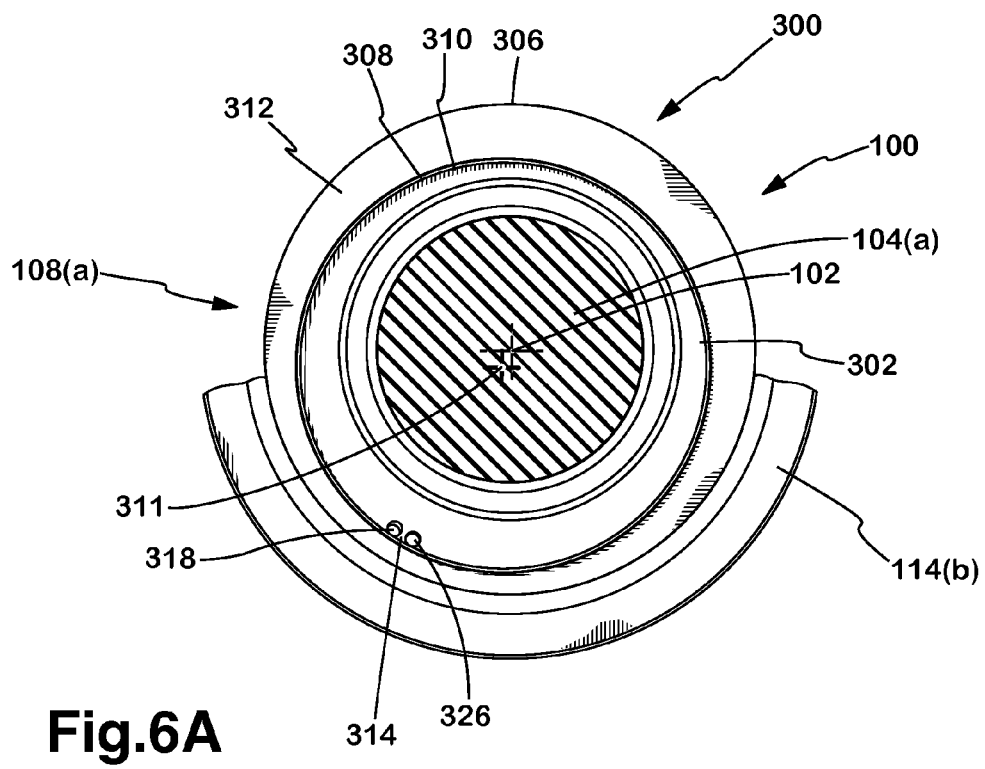
FIG. 6(a) is a transverse cross-sectional view of a crankshaft according to another embodiment taken above a sealing plate thereof.

As shown in FIG. 6, the closed perimeter 310 defines a circle having a central point 311 that is offset from the rotational axis 102. Point 314 is a point along the closed perimeter 310 that is further from the rotational axis 102 than any other point of the closed perimeter 310. In this embodiment, the point 314 is also closer to the edge 306 than any other point of the closed perimeter 310. FIG. 6(a) shows another embodiment in which the circle defined by the closed perimeter 310 has been moved further toward a portion of the edge 306 to more clearly show that the central point 311 is offset from the rotational axis 102.

It is contemplated that in other embodiments, the closed perimeter 310 may have any other suitable form or shape, such as an oval, an ellipse, an hexagon, an octagon, or any regular or irregular form or shape, as long as the closed perimeter 310 has a point such as the point 314 that is further from the rotational axis 102 than any other point of the closed perimeter 310, whether this is due to the particular shape of the closed perimeter 310 and/or to how the perimeter 308 is disposed within the top surface 302.

Figure 7A:
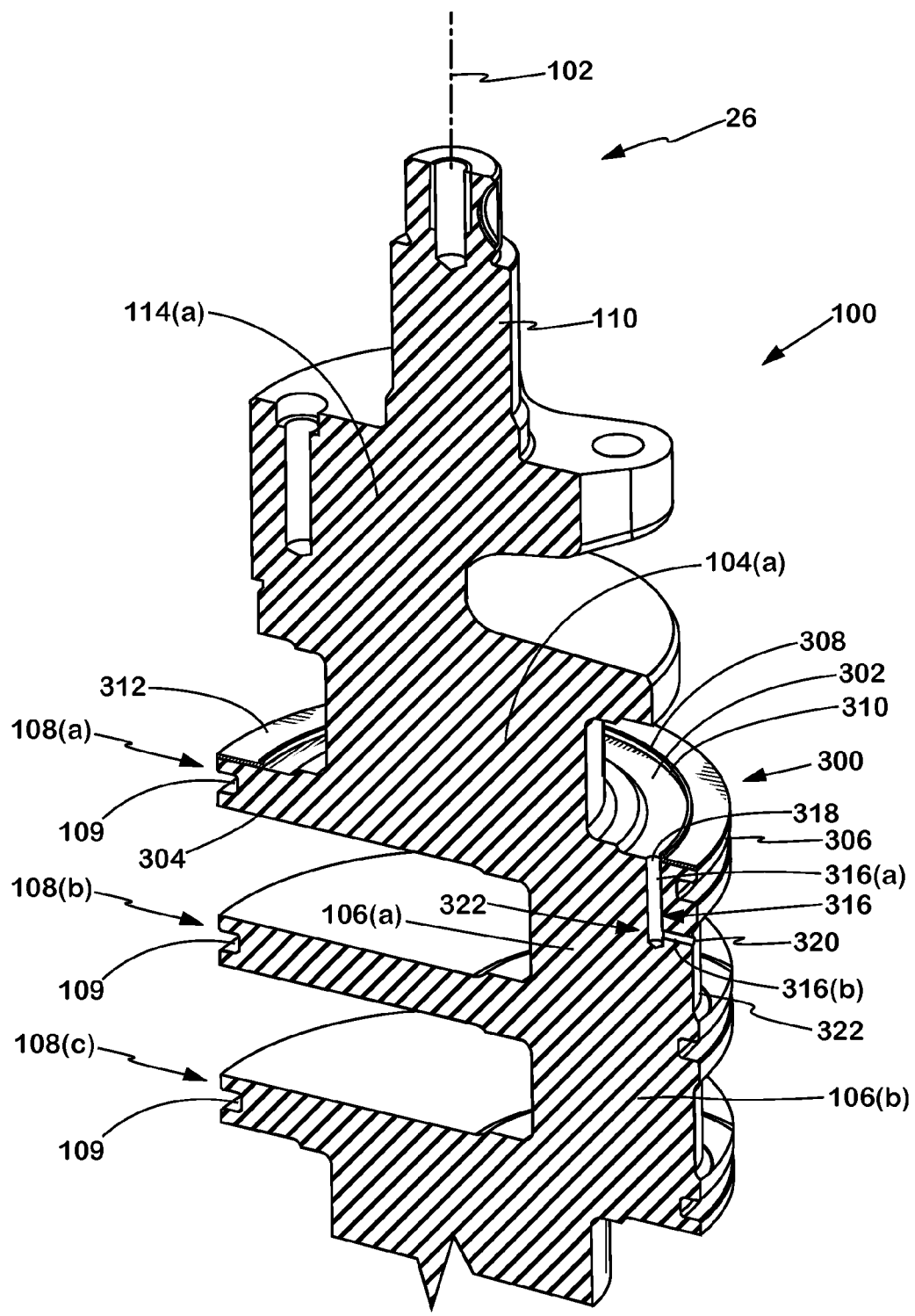
FIG. 7(a) is a cross-sectional view of a portion of the crankshaft of FIG. 2 taken along line 7-7 in FIG. 6.

As shown in FIGS. 3, 3(a) and 7(a), a channel 316 is defined within the platform 300 and the crankpin 106(a) that is adjacent to and below the platform 300. The channel 316 comprises two portions 316(a) and 316(b) and has an inlet 318 defined within the closed perimeter 310 of the top surface 302, close to the point 314. The channel 316 also has an outlet 320 defined within the exterior surface of the crankpin 106(a) and facing the needle bearings (not shown) within the connecting rod bearing assembly 250.

Figure 8A:
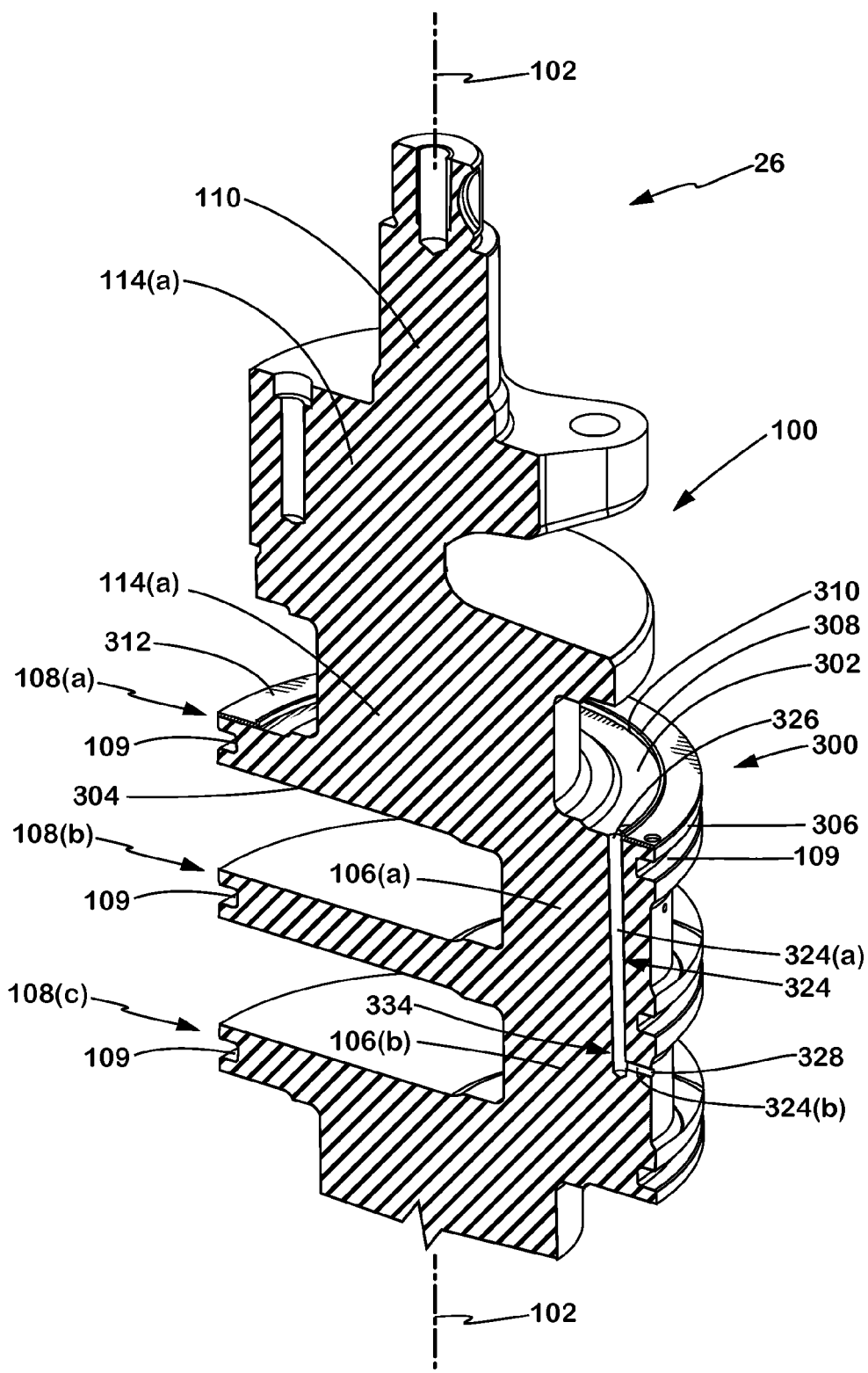
FIG. 8(a) is another cross-sectional view of a portion of the crankshaft of FIG. 2 taken along line 8-8 in FIG. 6.

As shown in FIG. 8(a), a second channel 324 is defined within the platform 300, the crankpin 106(a), the sealing plate 108(b) and the crankpin 106(b) that is adjacent and below the sealing plate 108(b). The channel 324 comprises two portions 324(a) and 324(b) and has an inlet 326 defined within the closed perimeter 310 of the top surface 302, close to the point 314. The channel 324 also has an outlet 328 defined within the exterior surface of the crankpin 106(b) and facing the needle bearings (not shown) within the connecting rod bearing assembly 250.

Figure 7B:
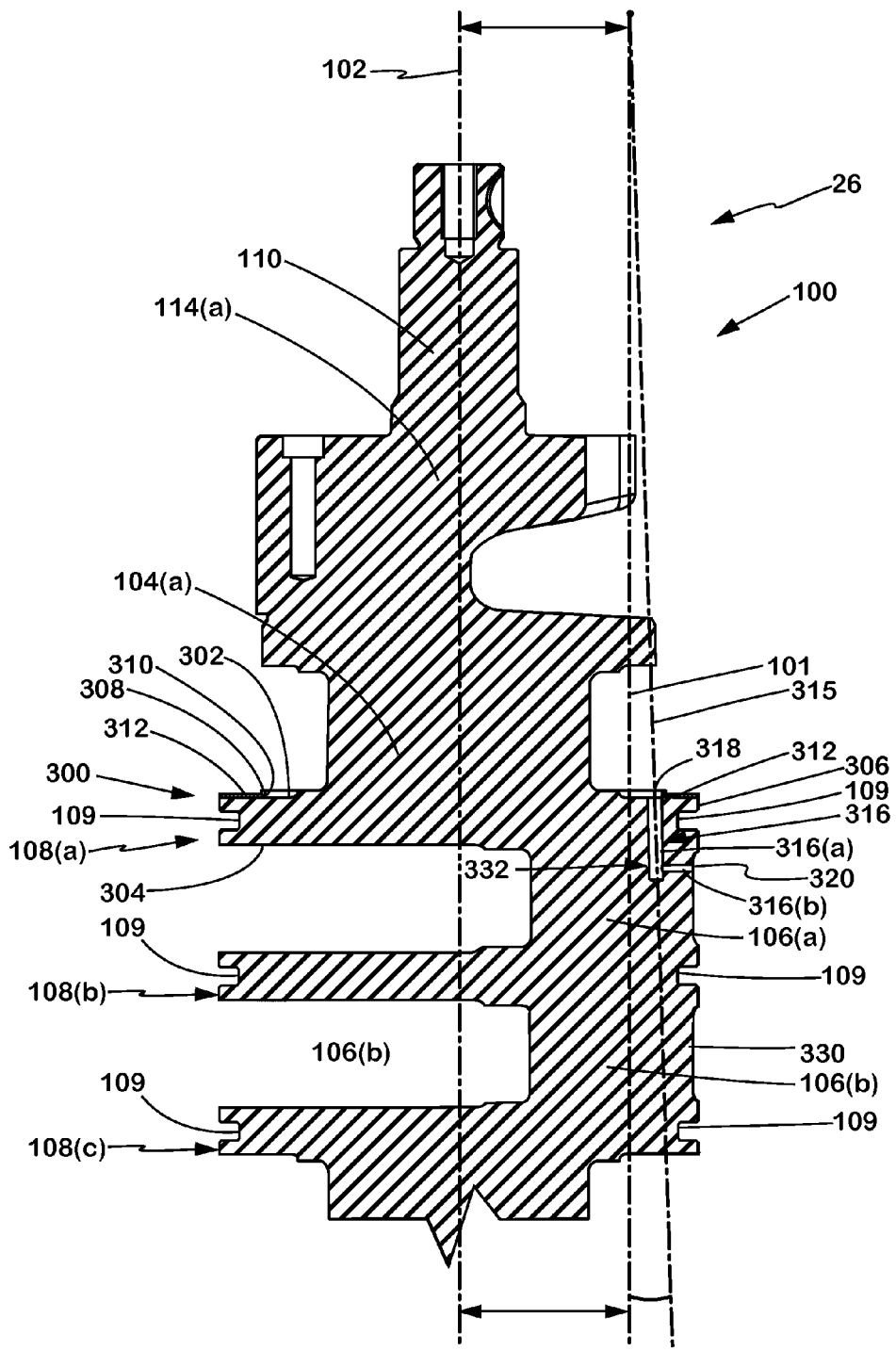
FIG. 7(b) is a cross-sectional view of a portion of the crankshaft of FIG. 2 taken along line 7-7 in FIG. 6.
Figure 8B:
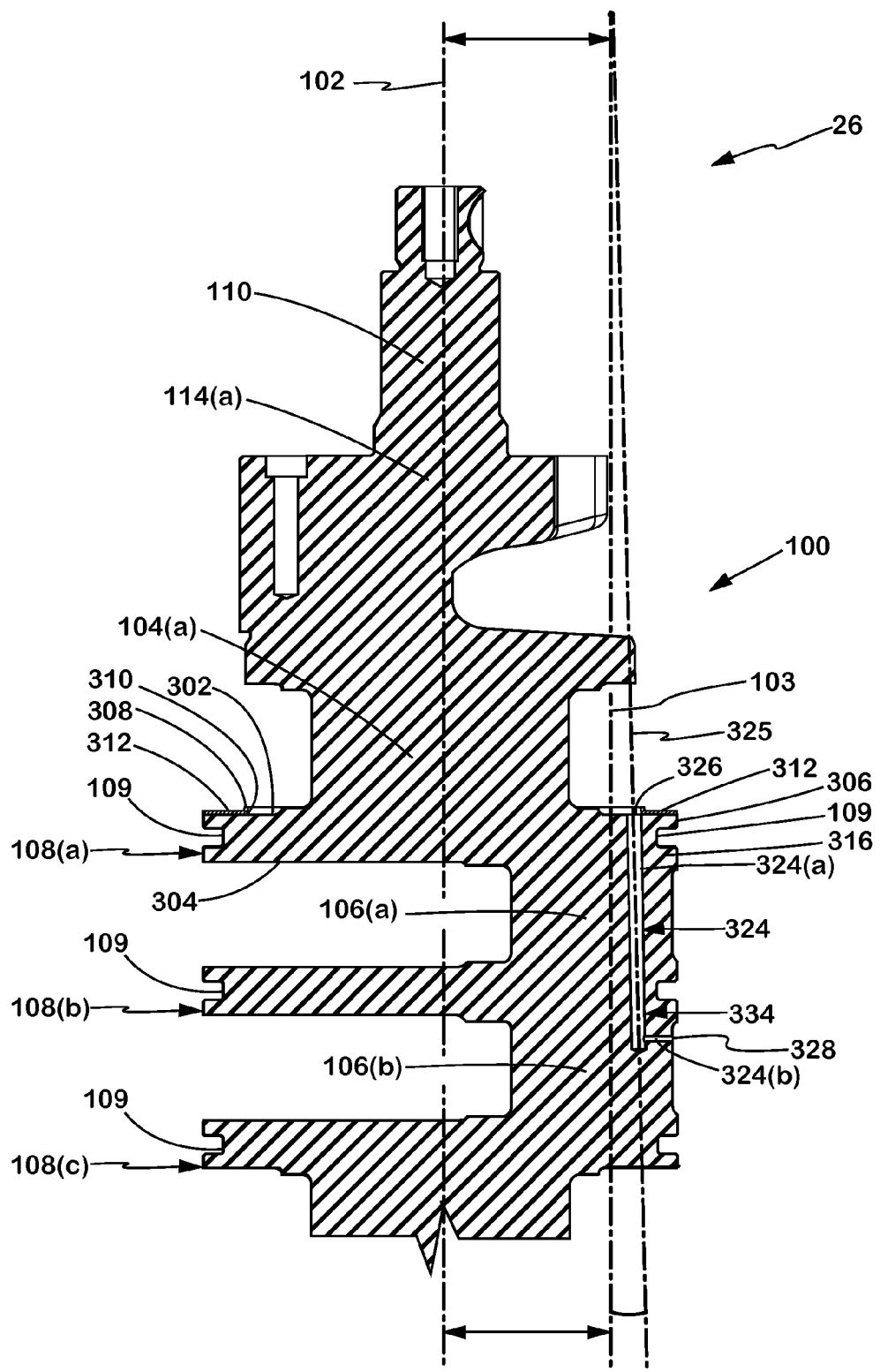
FIG. 8(b) is another cross-sectional view of a portion of the crankshaft of FIG. 2 taken along line 8-8 in FIG. 6.

As shown in FIGS. 7(b) and 8(b), axes 315, 325 passing through and parallel to portions 316(a), 324(b) of the channels 316, 324 define acute angles with axis 101, 103 which are parallel to the rotational axis 102 such that the lower portions 332, 334 of the portions 316(a), 324(b) of the channels 316, 324 are further from the rotation axis 102 than the inlets 318, 326.

It is contemplated that in another embodiment (not shown), the channels 316, 324 can be made of only one portion extending from the inlets 318, 326 to the outlets 320, 328, and that the outlets 320, 328 can be disposed in other locations in proximity with crankpins 106(a), 106(b) or the connecting rod bearing assemblies 250. It is also contemplated that one of channels 316, 324 can have other portions such as portions 316(a), 316(b), 324(a), 324(b) and that one of channels 316, 324 can split into two or more channels (not shown) so that one of inlets 318, 326 may be fluidly connected to the two outlets 320, 328.

In the embodiment described in FIGS. 1 to 9, when the crankshaft 26 is in use in the crankcase 12 of the vertically oriented two-stroke engine 10, lubricant is supplied to each of the main bearing assemblies 200 via conduits 204 and ports 206. A portion of the lubricant supplied to the main bearing assemblies 200 drops therefrom on the top surfaces 302 of each platforms 300 defined by the sealing plates 108. A portion of the lubricant received by the platforms 300 falls within the closed perimeter and is induced by centrifugal force to flow toward the wall 308. The centrifugal force then causes the portion of the lubricant to flow along the wall 308 toward the point 314 and to accumulate in the portion of the closed perimeter 310 which is close to the point 314 against the wall 308. A portion of the lubricant accumulated in the portion of the closed perimeter 310 which is close to the point 314 flows within the channels 316, 324 via the inlets 318, 326 and is discharged from the outlets 320, 328 in the connecting rod bearing assemblies 250. Since portions 316(a), 324(a) of the channels 316, 324 extend downwardly away from the rotation axis 102, the centrifugal force assists the gravitational force for drawing lubricant into the inlets 318, 328 and through the channels 316, 324.

Figure 9:
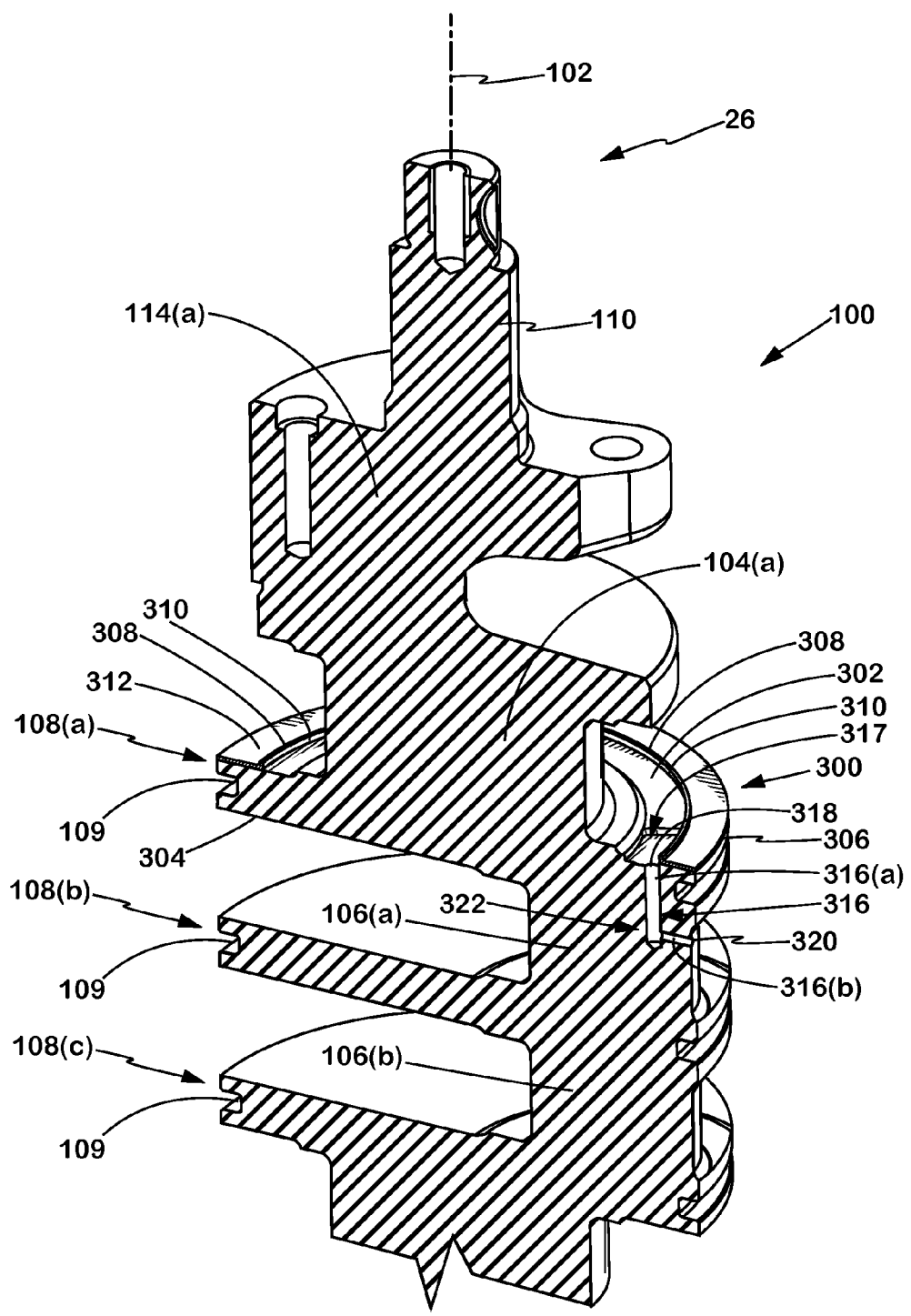
FIG. 9 is a cross-sectional view of a portion of a crankshaft according to another embodiment taken along its rotational axis.

It is contemplated that in another embodiment shown in FIG. 9, a recess 317 is defined in top surface 302 of the platform 300 close to the point 314, and the inlets 316, 326 are disposed within the recess 315. When the crankshaft 26 is in use in the crankcase 12 of the vertically oriented two-stroke engine 10, lubricant accumulates in the recess 317.

Figure 10:
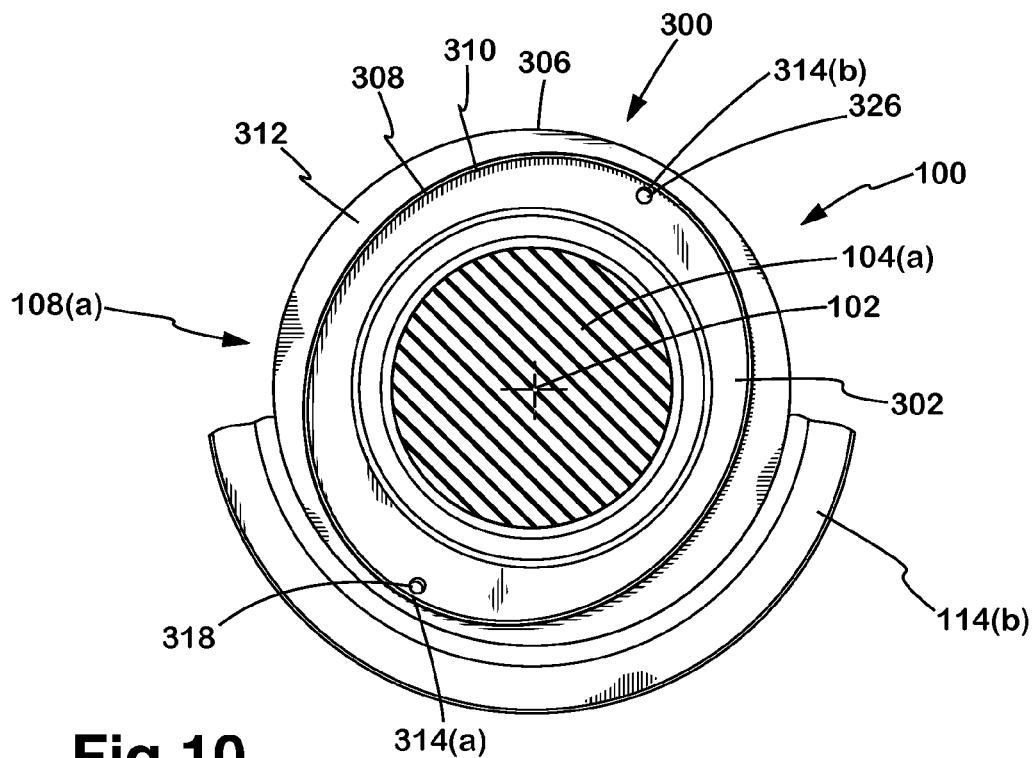
FIG. 10 is a transverse cross-sectional view of a crankshaft according to another embodiment taken above a sealing plate thereof.

In another embodiment shown in FIG. 10, the closed perimeter 310 defines an ellipse and has two points 314(a), 314(b) that are further from the rotational axis 102 than any other point of the closed perimeter 310. The inlet 318 is defined within the closed perimeter 310, close to the point 314(a), while the inlet 326 is defined within the closed perimeter 310, close to the point 314(b). It is contemplated that in another embodiment, (not shown) recesses such as the recess 317 can be defined in the top surface 302 of the platform 300 close to each of the points 314(a), 314(b) and that the inlets 318, 326 can be disposed within those recesses. Channels (not shown) such as channels 316, 324 have a suitable number of portions (not shown) such as portions 316(a), 316(b), 324(a), 324(b) suitably defined within the platform 300, and have outlets (not shown) such as outlets 320, 328 disposed in the exterior surface of one of the crankpins 106(a), 106(b), or in proximity with the crankpins 106(a), 106(b) or the connecting rod bearing assemblies 250.

It is also contemplated that in other embodiments (not shown) the closed perimeter 310 may define any other shape having two or more points such as point 314 that are further from the rotational axis 102 than any other point of the closed perimeter 310 and a corresponding number of channel inlets such as inlets 318, 326 connected to two or more channels such as channels 316, 324 (which may have various suitable portions such as portions 316(a), 316(b), 324(a), 324(b) defined with the platform 300) having outlets such as outlets 320, 328 disposed in the exterior surface of the crankpins 106(a), 106(b), or in proximity with the crankpins 106(a), 106(b) or the connecting rod bearing assemblies 250.

Figure 11:
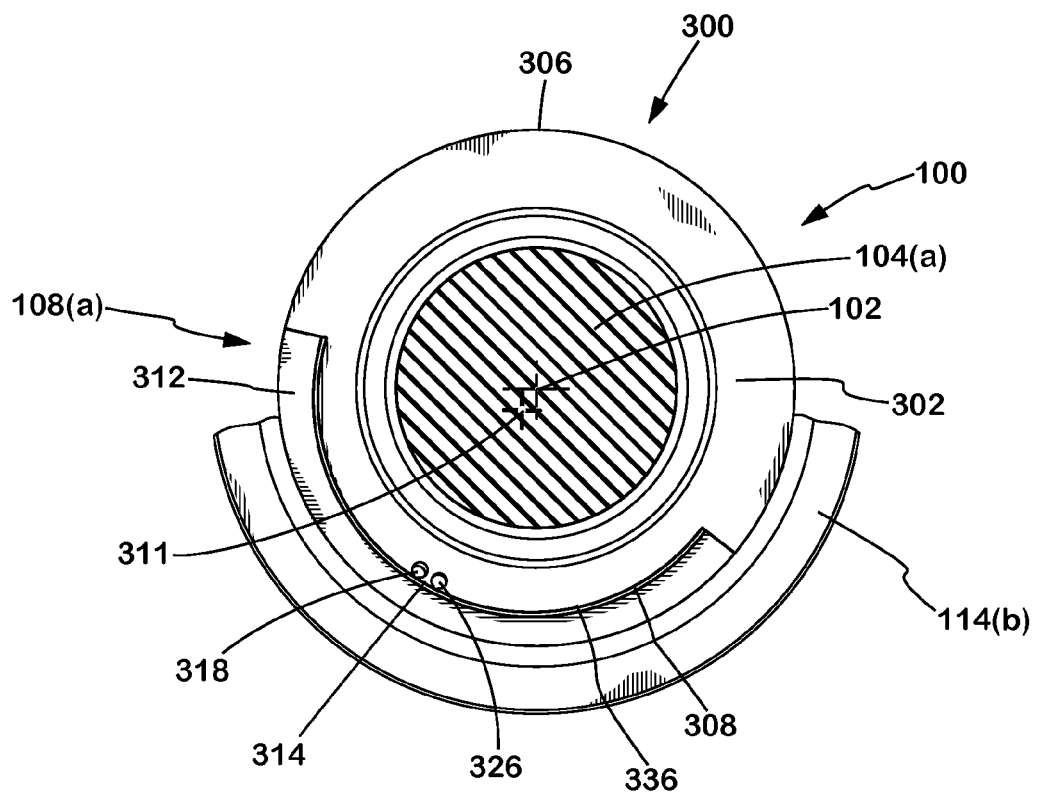
FIG. 11 is a transverse cross-sectional view of a crankshaft according to another embodiment taken above a sealing plate thereof.

In a further embodiment shown in FIG. 11, the wall 308 does not define a closed perimeter such as the closed perimeter 310 but rather an arc 336 having a center of curvature 311 that is offset from the rotational axis 102. The point 314 is disposed along the arc 336 and is further from the rotational axis 102 than any other point of the arc 336. It is contemplated that in other embodiments (not shown), the wall 308 may define any other shape or form permitting to have a point such as point 314 that is further from the rotational axis 102 than any other point of the shape or form defined by the wall 308. The wall 308 may also be disposed elsewhere on the top surface 302 of the platform 300 as long as the shape defined thereby has a point such as the point 314 that is further from the rotational axis 102 than any other point of that shape. In this embodiment, the inlets 318, 326 are disposed close to the point 314 and the channels 316, 324 and channel outlets 320, 328 are as described with regard to the embodiment shown in FIGS. 1 to 9.

Figure 12:
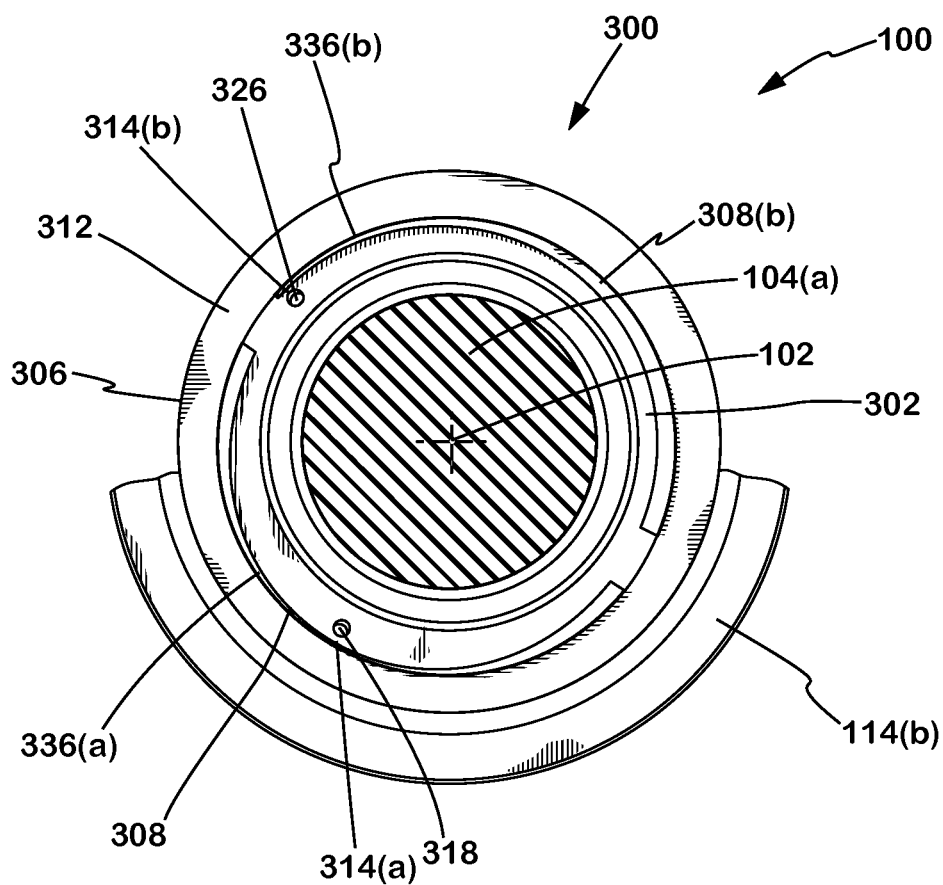
FIG. 12 is a transverse cross-sectional view of a crankshaft according to another embodiment taken above a sealing plate thereof.

In yet another embodiment, shown in FIG. 12, two walls 308(a), 308(b) define two curved lines 336(a), 336(b). The point 314(a) is disposed along the line 336(a) and is further from the rotational axis 102 than any other point along the line 336(a), and the point 314(b) is disposed along the line 336(b) and is further from the rotational axis 102 than any other point along the line 336(b). In this embodiment, the inlet 318 is disposed close to the point 314(a) and the inlet 326 is disposed close to the point 314(b). Channels (not shown) such as channels 316, 324 have a suitable number of portions (not shown) such as portions 316(a), 316(b), 324(a), 324(b) suitably defined within the platform 300, and have outlets (not shown) such as outlets 320, 328 disposed in the exterior surface of the crankpins 106(a), 106(b), or in proximity with the crankpins 106(a), 106(b) or the connecting rod bearing assemblies 250.

It is contemplated that in other embodiments (not shown), the walls 308(a), 308(b) may define any other shapes, forms or lines, and each of those shapes, forms or lines may or may not be similar to each other even if the walls are disposed on a same top surface 302 of a platform 300 (as shown in FIG. 12), as long as such shapes, forms or lines permit to have points such as points 314(a), 314(b) that are further from the rotational axis 102 than any other point along the shapes, forms or lines defined by the walls 308(a), 308(b). It is also contemplated that more than two walls can be disposed on a single top surface 302 of a platform 300, each wall defining a shape or form having a point such as point 314 that is further from the rotational axis 102 than any other point of the shape or form defined by this wall. In such embodiments, inlets such as inlets 318, 326 are disposed close to each point such as point 314. Channels such as channels 316, 324 have a suitable number of portions such as portions 316(a), 316(b), 324(a), 324(b) suitably defined within the platform 300 and have outlets such as outlets 320, 328 disposed in the exterior surface of the crankpins 106(a), 106(b), or in proximity with the crankpins 106(a), 106(b) or the connecting rod bearing assemblies 250.

It is also contemplated that there may be only one inlet such as inlet 318 connected to only one outlet such as outlet 320 for providing lubricant to only one connecting rod bearing assembly 250, that inlets such as inlets 318, 324 may be connected to only one such outlet for providing lubricant to only one connecting rod bearing assembly 250. It is also contemplated that one inlet such as inlet 318 may be connected to two or more outlets such as outlets 320, 328 for providing lubricant to two or more connecting rod bearing assemblies 250. Finally, it is contemplated that more than two inlets such as inlets 318, 326 may be connected to more than two outlets such as outlets 320, 328 for providing lubricant to more than two connecting rod bearing assemblies 250.

Modifications and improvement to the above described embodiments may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A crankshaft for a two-stroke engine having a crankshaft body defining a rotational axis, the crankshaft comprising:
at least one main bearing journal connected to the crankshaft body;
at least one crankpin connected to the crankshaft body, the at least one crankpin being axially spaced from the at least one main bearing journal;
at least one receiving platform connected to the crankshaft body, the at least one receiving platform being disposed between the at least one main bearing journal and the at least one crankpin;
the at least one receiving platform having a top surface and a bottom surface, the top surface being disposed between the bottom surface and the at least one main bearing journal, the top surface having an edge and a wall, portions of the wall being non-equidistant from the rotational axis and one of the portions of the wall being furthest from the rotational axis, the one of the portions being an outermost portion; and at least one channel defined at least in part within the at least one receiving platform, the at least one channel having a channel inlet and a channel outlet, the channel inlet being disposed between the outermost portion and the rotational axis, in proximity to the outermost portion, and the channel outlet being disposed in proximity to the at least one crankpin.

2. The crankshaft of claim 1, wherein the at least one main bearing journal, the at least one crankpin and the at least one receiving platform are integrally formed with the crankshaft body.

3. The crankshaft of claim 1, wherein:
the channel outlet is further from the rotational axis than the channel inlet.

4. The crankshaft of claim 1, wherein at least a portion of the at least one channel extends away from the rotational axis as the at least one channel extends from the channel inlet to the channel outlet.

5. The crankshaft of claim 1, wherein the wall defines a closed perimeter disposed between the wall and the rotational axis.

6. The crankshaft of claim 5, wherein a shape of the closed perimeter is one of a circle, an oval and an ellipse.

7. The crankshaft of claim 5, wherein a shape of the closed perimeter is a circle, a center of the circle being offset from the rotational axis.

8. The crankshaft of claim 1, further comprising:
a recess formed within the top surface of the at least one receiving platform; and
wherein the inlet of the at least one channel is disposed within the recess.

9. The crankshaft of claim 1, wherein:
the at least one crankpin is at least two crankpins;
the at least one channel is at least two channels;
the at least two channels having respective channel inlets disposed adjacent to each other;
one of the at least two channels having a channel outlet disposed in proximity to one of the at least two crankpins;
an other of the at least two channels having a channel outlet disposed in proximity to an other of the at least two crankpins.

10. The crankshaft of claim 1, wherein:
when the crankshaft is in use in the two-stroke engine, the rotational axis is generally vertical, the at least one main bearing journal is housed within at least one main bearing body, the at least one main bearing journal and the at least one main bearing body forming at least one main bearing assembly, and the at least one crankpin is housed in at least one connecting rod bearing body, the at least one crankpin and at least one connecting rod bearing forming at least one connecting rod bearing assembly;
lubricant is supplied to at least one main bearing assembly;
at least a portion of the lubricant drops from the main bearing assembly on the top surface of the at least one receiving platform;
a portion of the lubricant on the top surface of the at least one receiving platform is induced by centrifugal force to flow to the outermost portion;
lubricant within the outermost portion flows in the at least one channel via the channel inlet; and lubricant flowing in the channel is discharged from the at least one channel outlet, and from the channel outlet the lubricant flows to the at least one connecting rod bearing assembly.

11. The crankshaft of claim 1, wherein:
the at least one receiving platform is a sealing plate.

12. A crankshaft for a two-stroke engine having a crankshaft body defining a rotational axis, the crankshaft comprising:
at least one main bearing journal connected to the crankshaft body;
at least one crankpin connected to the crankshaft body, the at least one crankpin being axially spaced from the at least one main bearing journal;
at least one receiving platform connected to the crankshaft body, the at least one receiving platform being disposed between the at least one main bearing journal and the at least one crankpin,
the at least one receiving platform having a top surface and a bottom surface, the top surface being disposed between the bottom surface and the at least one main bearing journal, the top surface having an edge and at least one wall, portions of the at least one wall being non-equidistant from the rotational axis and at least one portion of the at least one wall being more distant from the rotational axis than other portions of the at least one wall, the at least one portion of the at least one wall being at least one outer portion; and
at least one channel defined at least in part within the at least one receiving platform, the at least one channel having a channel inlet and a channel outlet,
the channel inlet being disposed between the at least one outer portion and the rotational axis, in proximity to the at least one outer portion, and
the channel outlet being disposed in proximity to the at least one crankpin.

13. The crankshaft of claim 12, wherein the at least one main bearing journal, the at least one crankpin and the at least one receiving platform are integrally formed with the crankshaft body.

14. The crankshaft of claim 12, wherein:
the channel outlet is further from the rotational axis than the channel inlet.

15. The crankshaft of claim 12, wherein the at least one channel extends away from the rotational axis as the at least one channel extends from the channel inlet to the channel outlet.

16. The crankshaft of claim 12, wherein:
the at least one wall is at least two walls;
the at least one outer portion is at least two outer portions;
the at least one channel is at least two channels, each one of the at least two channels having an inlet and an outlet;
each of the at least two outer portions having disposed therein at least one of the channel inlets.

17. The crankshaft of claim 16, wherein:
the at least one crankpin is at least two crankpins;
the channel outlet of at least one of the at least two channels is disposed in proximity to one of the at least two crankpins; and
the channel outlet of at least one other of the at least two channels is disposed in proximity to at least one other of the at least two crankpins.

18. A crankshaft for a two-stroke engine having a crankshaft body defining a rotational axis, the crankshaft comprising:
at least one main bearing journal connected to the crankshaft body;

at least one crankpin connected to the crankshaft body, the at least one crankpin being axially spaced from the at least one main bearing journal;

at least one receiving platform connected to the crankshaft body, the at least one receiving platform being disposed between the at least one main bearing journal and the at least one crankpin, the at least one receiving platform having a top surface and a bottom surface, the top surface being disposed between the bottom surface and the at least one main bearing journal, the top surface having an edge and a wall defining a closed perimeter, portions of the closed perimeter being non-equidistant from the rotational axis and at least one portion of the closed perimeter being more distant from the rotational axis than other portions of the closed perimeter, the at least one portion of the closed perimeter being at least one outer portion; and at least one channel defined at least in part within the at least one receiving platform, the at least one channel having a channel inlet and a channel outlet, the channel inlet being disposed within the closed perimeter in proximity to the at least one outer portion, and the channel outlet being disposed in proximity to the at least one crankpin.

19. The crankshaft of claim 18, wherein the at least one main bearing journal, the at least one crankpin and the at least one receiving platform are integrally formed with the crankshaft body.

20. The crankshaft of claim 18, wherein:

the at least one channel is at least two channels, each one of the at least two channels having an inlet and an outlet;

the at least one outer portion of the closed perimeter is at least two outer portions; and each of the at least two outer portions having disposed therein at least one of the channel inlets.

21. The crankshaft of claim 20, wherein:

the at least one crankpin is at least two crankpins;

the channel outlet of at least one of the at least two channels is disposed in proximity to one of the at least two crankpins; and the channel outlet of at least one other of the at least two channels is disposed in proximity with at least one other of the at least two crankpins.

22. A two-stroke engine comprising:

an engine casing;

at least one cylinder disposed within the engine casing;

at least one piston movable within the at least one cylinder;

a crankshaft having a crankshaft body defining a rotational axis, the crankshaft comprising at least one main bearing journal, at least one crankpin and at least one receiving platform having a top surface and a bottom surface, the at least one main bearing journal, the at least one crankpin and the at least one receiving platform being connected to the crankshaft body, the at least one crankpin being axially spaced from the at least one main bearing journal and the at least one receiving platform being disposed so that the top surface is disposed between the bottom surface and at least one main bearing journal;

the crankshaft being rotatably mounted within the engine casing via at least one main bearing assembly comprising a main bearing body and one of the at least one main bearing journal, the main bearing body being connected to the engine casing;

at least one connecting rod having a first end and a second end, the first end being operatively connected to the at least one piston and the second end being rotatably connected to the crankshaft via a connecting rod bearing assembly comprising a connecting rod body and one of the at least one crankpin, the connecting rod body being connected to the second end of the connecting rod;

the top surface of the at least one receiving platform having an edge and a wall, portions of the wall being non-equidistant from the rotational axis and one of the portions of the wall being furthest from the rotational axis, the one of the portions being an outermost portion; and at least one channel defined at least in part within the at least one receiving platform, the at least one channel having a channel inlet and a channel outlet, the channel inlet being disposed between the outermost portion and the rotational axis, in proximity to the outermost portion, and the channel outlet being disposed in proximity to the connecting rod bearing assembly of one of the at least one connecting rod.

23. The crankshaft of claim 22, wherein the at least one main bearing journal, the at least one crankpin and the at least one receiving platform are integrally formed with the crankshaft body.

24. The crankshaft of claim 22, wherein the at least one channel extends away from the rotational axis as the at least one channel extends from the channel inlet to the channel outlet.

25. The two-stroke engine of claim 22, wherein the wall defines a closed perimeter.

* * * * *